(12) United States Patent
Hsu

(10) Patent No.: US 7,896,502 B2
(45) Date of Patent: Mar. 1, 2011

(54) PROJECTION APPARATUS PROVIDED WITH A HEAT SINK

(75) Inventor: Nien-Hui Hsu, Miao Li County (TW)

(73) Assignee: Coretronic Corporation, Chunan (TW)

( * ) Notice: Subject to any disclaimer, the term of this patent is extended or adjusted under 35 U.S.C. 154(b) by 1076 days.

(21) Appl. No.: 11/604,367

(22) Filed: Nov. 27, 2006

(65) Prior Publication Data
US 2007/0177109 A1    Aug. 2, 2007

(30) Foreign Application Priority Data
Jan. 27, 2006    (TW)    ............................ 95100455 A

(51) Int. Cl.
G03B 21/18    (2006.01)
(52) U.S. Cl. ...................................... 353/61
(58) Field of Classification Search .................. 353/57, 353/58, 61, 60, 119, 88–93, 97, 94; 165/104.11, 165/104.33; 348/748
See application file for complete search history.

(56) References Cited

U.S. PATENT DOCUMENTS

| | | | |
|---|---|---|---|
| 3,132,049 A | | 5/1964 | Cohen |
| 4,925,295 A | * | 5/1990 | Ogawa et al. ................. 353/57 |
| 6,443,575 B1 | * | 9/2002 | Miyamoto et al. ............. 353/58 |
| 6,481,854 B1 | * | 11/2002 | Sugawara et al. .............. 353/52 |
| 6,497,489 B1 | * | 12/2002 | Li et al. ......................... 353/61 |
| 6,709,115 B2 | | 3/2004 | Chimura et al. |
| 6,742,898 B2 | * | 6/2004 | Shouji ........................... 353/31 |
| 6,746,125 B2 | * | 6/2004 | Nakano et al. ................. 353/61 |
| 6,966,655 B2 | * | 11/2005 | Hara et al. ..................... 353/61 |
| 7,008,180 B2 | * | 3/2006 | Fujimori et al. ........... 415/121.2 |
| 7,241,018 B2 | * | 7/2007 | Shin ........................... 353/119 |
| 2004/0263799 A1 | * | 12/2004 | Lim .............................. 353/61 |

FOREIGN PATENT DOCUMENTS

| | | | |
|---|---|---|---|
| CN | 1512262 A | | 7/2004 |
| CN | 1588228 A | | 3/2005 |
| JP | 2002040562 A | * | 2/2002 |
| TW | 524319 | | 3/2003 |

* cited by examiner

*Primary Examiner*—Georgia Y Epps
*Assistant Examiner*—Danell L Owens
(74) *Attorney, Agent, or Firm*—Birch, Stewart, Kolasch & Birch, LLP

(57) ABSTRACT

A projection apparatus includes an outer casing, a light source disposed within the casing for generating light beams, and an optical engine connected to the light source for receiving the light beams in order to project an image. A heat sink includes an air tunnel mounted within the casing, and having air inlet disposed above the light source, and an exhaust fan mounted within an opening unit in the casing such that the fan unit is disposed in alignment with an air outlet of the air tunnel to transmit the intensive heat generated from the light source.

12 Claims, 3 Drawing Sheets

PROJECTION APPARATUS PROVIDED WITH A HEAT SINK

FIELD OF THE INVENTION

The invention relates to a projection apparatus, and more particularly to a projection apparatus provided with a heat sink.

BACKGROUND OF THE INVENTION

FIG. 1 is a top sectional view of a conventional projection apparatus 1, which includes an outer casing 11, a light source 12 mounted within the outer casing 11, an optical engine 13 and a power source 14. The light source 12 is capable of generating light beams to the optical engine 13. The light source 12 preferably includes two lamps for generating sufficient light beams in order to enhance the lighting. The optical engine 13 is connected to the light source 12 so as to receive the light beams emitted from the light source 12. The power source 14 is used for supplying electrical power to the conventional projection apparatus 1.

The light source 12 usually generates intensive heat during operation of the conventional projection apparatus 1. Traditionally, an exhaust fan unit 15 is disposed adjacent to the light source 12 in order to dissipate the heat from an interior of the outer casing to an exterior thereof. The output shaft, the motor or the blades of the fan unit 15 tend to ruin or damage when the fan unit 15 is disposed too close to the light source 12. The intensive heat aggravates in case of that damage is occurred in the fan unit 15, and eventually results in damage to the conventional projection apparatus 1. Since the conventional projection apparatus 1 has double lamps with high watts and the situation for dissipating intensive heat aggravates when the fan unit 15 fails to dissipate the heat from within the outer casing 11.

SUMMARY OF THE INVENTION

It is the object of the present invention to provide a heat sink for use in a projection apparatus. The heat sink has a structure to effectively dissipate the intensive heat generated during operation of the projection apparatus.

In one aspect of the present invention, a projection apparatus is provided to include an outer casing formed with an opening unit, a light source disposed within the outer casing for generating light beams, a heat sink, and an optical engine disposed within the outer casing and connected to the light source for receiving the light beams in order to project an image. The heat sink includes an air tunnel and an exhaust fan unit. The air tunnel is mounted within the outer casing, and has an air inlet disposed adjacent to and above the light source and an air outlet opposite to an air inlet. The exhaust fan unit is mounted on the outer casing within the opening unit such that the exhaust fan unit is disposed in alignment with the air outlet of the air tunnel so as to exhaust heat generated by the light source toward an exterior of the outer casing via the air tunnel. The projection apparatus further includes an optical engine disposed within the outer casing and connected to the light source for receiving the light beams in order to project an image.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCCRIPTIONS OF THE PREFERRED EMBODIMENTS

Figure 1:
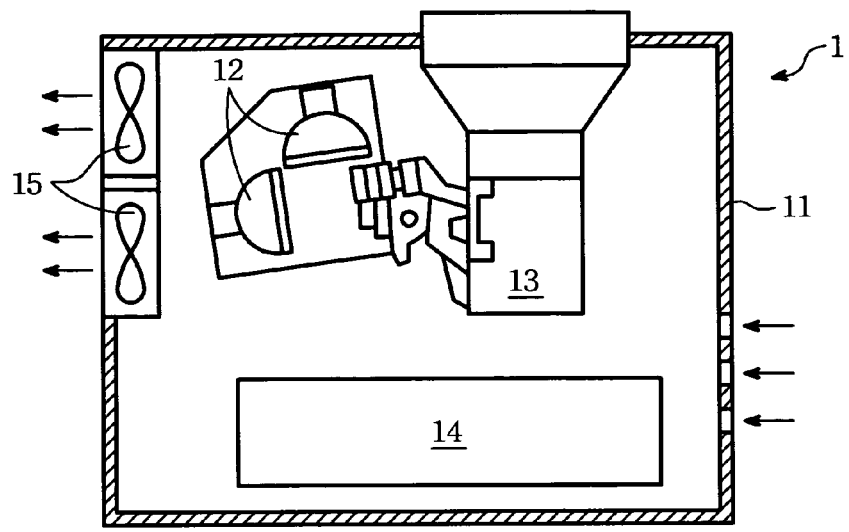
FIG. 1 is a top sectional view of a conventional projection apparatus.
Figure 2:
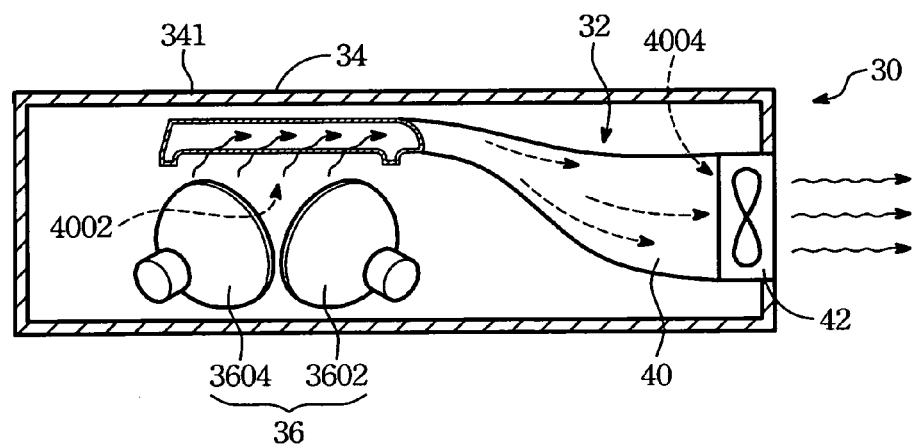
FIG. 2 is a top sectional view of a projection apparatus of the present invention.
Figure 3:
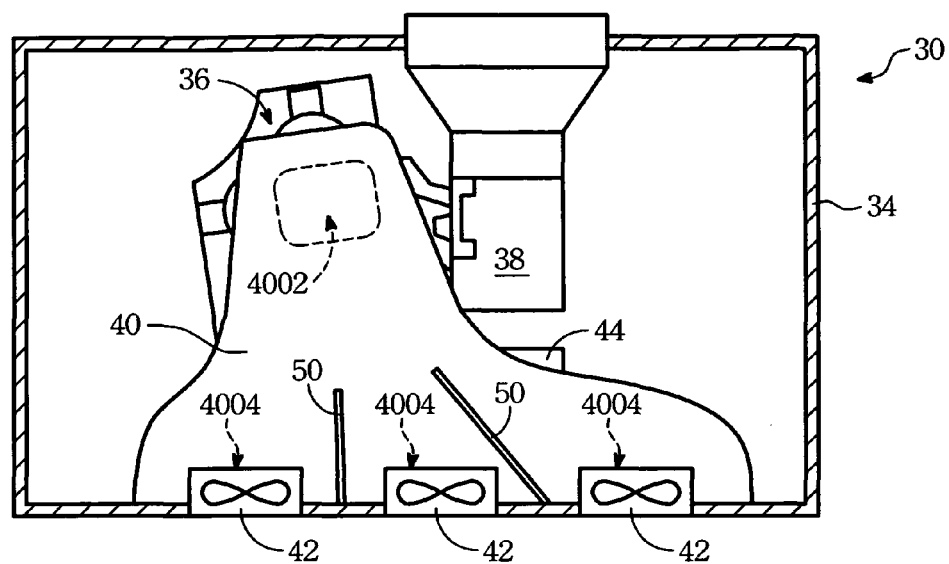
FIG. 3 is a top sectional view of the first embodiment of an air tunnel employed in the projection apparatus of the present invention.

Referring to FIGS. 2 and 3, a projection apparatus 30 of the present invention is shown to include an outer casing 34, a light source 36, a heat sink 32, an optical engine 38 and a power source 44. The light source 36 is disposed within the outer casing 34 for generating light beams for the optical engine 34. The light source 36 preferably includes two lamps 3602, 3604 for generating sufficient light beams in order to enhance the lighting of the present projection apparatus 30. Thus, a relatively high temperature is resulted during operation of the projection apparatus 30. Though two lamps 3602, 3604 are employed in the present projection apparatus 30, the scope of the present invention encompasses all other modifications. The optical engine 38 is disposed within the outer casing 34 and is connected to the light source 36 for receiving the light beams in order to project an image onto a screen (not shown). The power source 44 supplies electrical power for operation of the present projection apparatus 30.

The heat sink 32 includes an air tunnel 40 and an exhaust fan unit 42. The air tunnel 40 is disposed within the outer casing 34, and has an air inlet 4002 and an air outlet 4004 opposite to the inlet 4002. The air inlet 4002 of the air tunnel 40 is disposed at an elevation above the light source 36, i.e. between the light source 36 and an upper portion 341 of the outer casing 34. Since the intensive heat generated by the light source 36 rises upward due to evaporation phenomenon, the hot air thereof is guided into the air tunnel 40 via the air inlet 4002. In addition, the air inlet 4002 of the air tunnel 40 can be disposed adjacent to a lateral side of the light source 36 (not shown) in order to collect the hot air thereinto.

The exhaust fan unit 42 is preferably an axial fan unit which is mounted within an opening unit in outer casing 34 such that the exhaust fan unit 42 is disposed in alignment with the air outlet 4004 of the air tunnel 40 to exhaust heat and hot air generated by the light source 36 toward an exterior of the outer casing 34. The heat density of the hot air scatters uniformly while the hot air transmits along the longitudinal length of the air tunnel 40. Thus, the temperature within the outer casing 34 is lowered. Due to this meritorious feature, the size of the exhaust fan unit 42 is reduced when compared to that of the prior art. The effective heat dissipation subsequently prevents the damage caused to the blades or the motor of the exhaust fan unit 42. Moreover, presence of the air tunnel 40 in the outer casing 34 serves as a light shield around the light source 36 so that there is no gap to permit the light leakage from the projection apparatus of the present invention, which, in turn, upgrades the projection ability of the projection apparatus 30 of the present invention.

The outer casing 34 is formed with a plurality of openings, such as three openings in the embodiment which cooperatively define the opening unit. The exhaust fan unit 42 preferably includes a plurality of exhaust fans such as three exhaust fans respectively mounted within the openings in the outer casing 34 in the embodiment. FIG. 3 shows a top sectional view of the air tunnel 40 employed in the projection apparatus according to the present invention. The outer casing 34 has a lateral sidewall formed with the openings. The heat sink 32 further includes at least one partition, for example two partitions 50 in the embodiment, extending inwardly into the air tunnel 40 from the lateral sidewall for guiding the heat and hot air generated by the light source 36 uniformly toward the exhaust fans. The provision of the partitions 50 within the air tunnel 40 enables the hot air to be guided toward the respective exhaust fan in an even manner. The increase in the numbers of the exhaust fans accordingly enhances the heat dissipation effect. However, the noise caused thereby is subsequently increased. In the prior art, employment of a single exhaust fan results in one fold increase of the airflow and the sound level of 15 (dB) decibel. In the present invention, when two exhaust fans are employed in the heat sink 32, there is an increase of one fold of the airflow and the sound level of 3 (dB) decibel. In compared to the prior art, a plurality of the exhaust fans can be installed and cooperating with the air tunnel 40 to lower the noise or the sound level generated due to activation of the exhaust fans.

Figure 4:
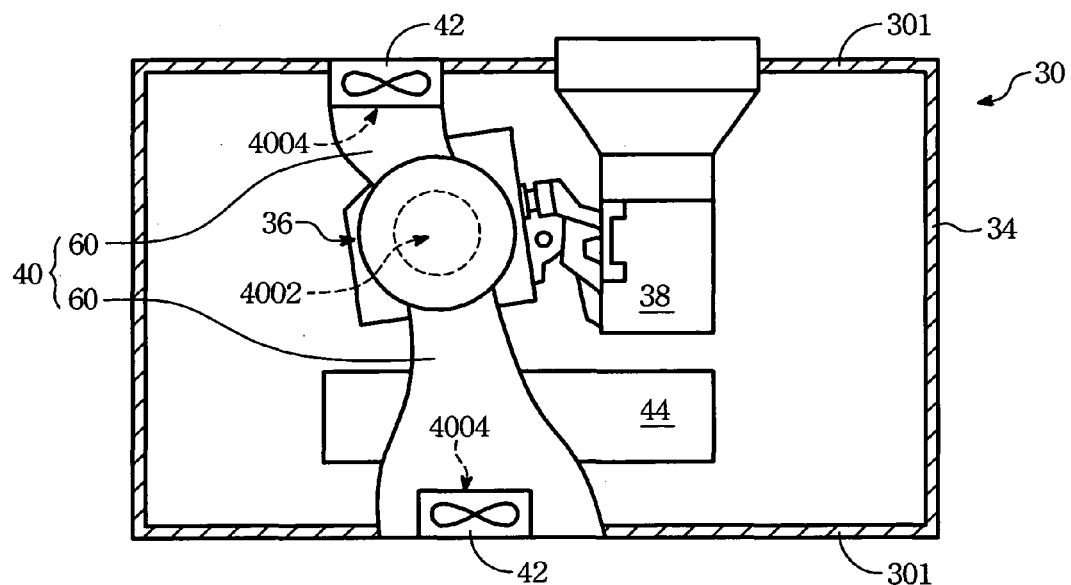
FIG. 4 is a top sectional view of the second embodiment of the air tunnel employed in the projection apparatus of the present invention.

FIG. 4 shows a top sectional view the second embodiment of an air tunnel 40 employed in the projection apparatus 30 of the present invention. The outer casing 30 has front and rear opposite sidewalls 301, each of which is formed with one of the openings. The air tunnel 40 includes front and rear tunnel sections 60. The front and rear tunnel sections 60 have two inner air inlets combined together to define a common air inlet 4002 disposed above the light source 36. The front and rear tunnel sections 60 further have two outer air outlets 4004 respectively disposed adjacent to the two openings and aligned with the exhaust fans. The arrangement of the two tunnel sections 60 can effectively scatter and dissipate the intensive heat from the front and rear sidewalls 301 of the outer casing 34 with the assistance of the exhaust fans 42. The position of the tunnel section 60 is altered randomly in order to complement with the location of the respective exhaust fan.

Figure 5:
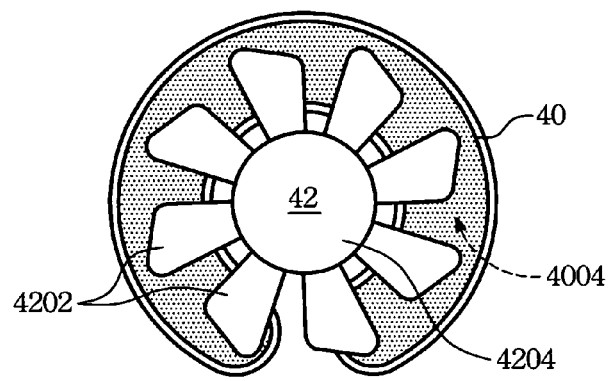
FIG. 5 is a cross sectional view illustrating an air outlet of the air tunnel shown in FIG. 3.
Figure 6:
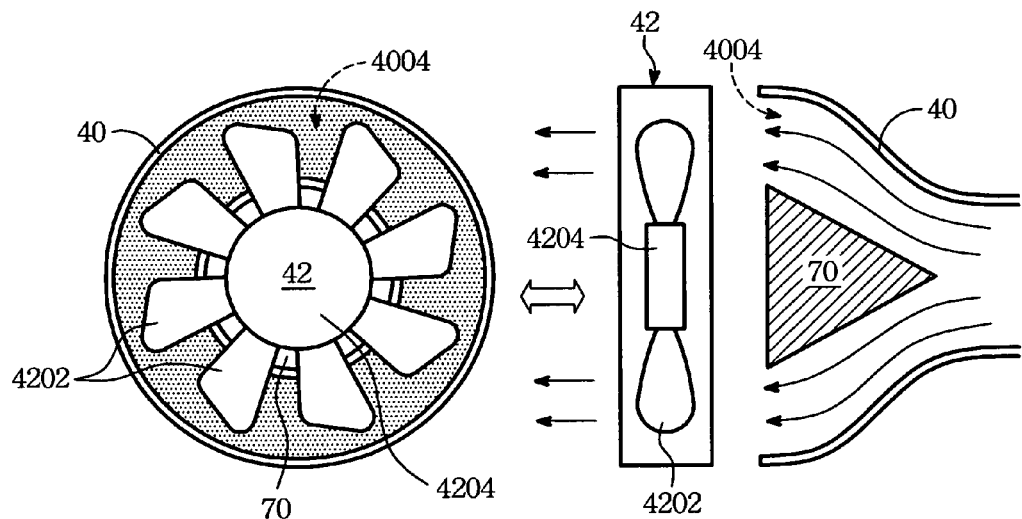
FIG. 6 is a cross sectional view illustrating an air outlet of the air tunnel shown in FIG. 4.

The air outlet 4004 of the air tunnel 40 is arranged in such a manner to prevent untimely ruin of the respective exhaust fan. Each exhaust fan generally includes a motor casing with an output shaft 4204, and a plurality of blades 4202 coupled to the output shaft 4204 and extending radially and outwardly from the motor casing. The blades 4202 are driven upon actuation of the motor. FIG. 5 shows a cross sectional view of the air outlet 4004 of the air tunnel 40 shown in FIG. 3 with respect to the exhaust fan 42. Note that the air outlet 4004 of the air tunnel 40 is generally U-shaped cross-section, is disposed offset to the motor casing, and is rather oriented toward the exhaust fan 42 in order to expel the hot air exterior of the outer casing 34 in addition to prevent the motor from being damaged. FIG. 6 shows a cross sectional view of the air outlet 4004 of the air tunnel 40 shown in FIG. 4 with respect to the exhaust fan 42. The air outlet 4004 of the air tunnel 40 is shaped as a circle in cross-section. The heat sink 32 further includes an obstacle 70 of triangular shape and is disposed midway in the air outlet 4004 of the air tunnel 40 so as to be in alignment with the motor casing. Under this arrangement, the discharged air is only oriented toward the blades 4202 of the exhaust fan 42 and not the motor, thereby preventing untimely ruin of the respective exhaust fan 42.

To summarize the above paragraphs, it is observable that since the air tunnel 40 is disposed above the light source 36, the hot air and intensive heat can collected and guided easily into the air tunnel 40 with the assistance of the exhaust fan 42. The hot air scatters uniformly while traveling along the longitudinal length of the air tunnel 40; the temperature within the outer casing 34 can be thus lowered due to the exhaust system. Arrangement of the air outlet 4004 of the air tunnel 40 offset to the motor casing prolongs servicing life of the exhaust fan 42. The partitions 50 in the air tunnel 40 assists in uniform airflow toward the respective exhaust fan 42. Moreover, the noise generated by the exhaust fan 42 is reduced, thereby providing comfort to the user of the projection apparatus of the present invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A projection apparatus comprising:
   an outer casing formed with an opening unit;
   a light source disposed within said outer casing for generating light beams;
   a heat sink including
     an air tunnel mounted within said outer casing, and having an air inlet disposed above and adjacent to said light source, and an air outlet opposite to said air inlet, and
     an exhaust fan unit mounted on said outer casing within said opening unit and disposed in alignment with said air outlet of said air tunnel so as to exhaust heat generated by said light source toward an exterior of said outer casing via said air tunnel; and
   an optical engine disposed within said outer casing and connected to said light source for receiving said light beams in order to project an image,
   wherein said outer casing has an upper portion, said air inlet of said air tunnel being disposed between said light source and said upper portion.

2. The projection apparatus according to claim 1, wherein said exhaust fan unit is an axial fan unit.

3. The projection apparatus according claim 1, wherein said light source includes a plurality of lamp units.

4. The projection apparatus according to claim 1, wherein said opening unit includes a plurality of openings, said exhaust fan unit including a plurality of exhaust fans respectively mounted within said openings in said outer casing.

5. The projection apparatus according to claim 4, wherein said outer casing has a lateral sidewall formed with said openings.

6. The projection apparatus according to claim 4, wherein said heat sink further includes a partition disposed within said air tunnel for guiding the heat generated by said light source toward said exhaust fans.

7. The projection apparatus according to claim 4, wherein said outer casing has two opposite sidewalls, each of said opposite sidewalls is formed with one of said openings, said air tunnel including two tunnel sections, said tunnel sections having two inner air inlets combined together to define a common air inlet disposed above said light source and two air outlets respectively disposed adjacent to and in alignment with said openings in said opposite sidewall.

8. The projection apparatus according to claim 1, wherein said exhaust fan unit includes a motor casing and a plurality of blades extending radially and outwardly from said motor casing, said air outlet of said air tunnel being disposed offset to said motor casing so as to be oriented toward said blades of said exhaust fan unit.

9. The projection apparatus according to claim 1, wherein said exhaust fan unit includes a motor casing and a plurality of blades extending radially and outwardly from said motor casing, said heat sink further including an obstacle disposed midway in said air outlet of said air tunnel so as to be in alignment with said motor casing.

10. The projection apparatus according to claim 1, wherein the air inlet of the air tunnel is directly above the light source and the heat generated by the light source flows upwardly for entering the air inlet of the air tunnel to be exhausted.

11. The projection apparatus according to claim 1, wherein said air outlet of said air tunnel is a U-shaped cross-section 12. The projection apparatus according to claim 1, wherein said air outlet of said air tunnel is shaped as a circle in cross-section.

* * * * *